(12) United States Patent
Axelsson et al.

(10) Patent No.: US 8,585,955 B2
(45) Date of Patent: Nov. 19, 2013

(54) CORE ASSEMBLY FOR AN INJECTION MOULDING-MACHINE

(75) Inventors: Ernst Gösta Robert Axelsson, Gränna (SE); Johan Emil Rinman, Jönköping (SE); Janarne Wetterheim, Jönköping (SE)

(73) Assignee: Etervind AB, Sollentuna (SE)

( * ) Notice: Subject to any disclaimer, the term of this patent is extended or adjusted under 35 U.S.C. 154(b) by 154 days.

(21) Appl. No.: 13/147,780

(22) PCT Filed: Feb. 5, 2010

(86) PCT No.: PCT/EP2010/051402
§ 371 (c)(1),
(2), (4) Date: Aug. 3, 2011

(87) PCT Pub. No.: WO2010/089362
PCT Pub. Date: Aug. 12, 2010

(65) Prior Publication Data
US 2011/0291327 A1    Dec. 1, 2011

(30) Foreign Application Priority Data
Feb. 5, 2009 (EP) .................................. 09152203

(51) Int. Cl.
*B29C 45/36*        (2006.01)
(52) U.S. Cl.
USPC ........... 264/328.1; 425/438; 425/577; 249/64
(58) Field of Classification Search
USPC ............. 264/328.1; 425/577, 438; 249/63, 64
See application file for complete search history.

(56) References Cited

U.S. PATENT DOCUMENTS

| | | | | |
|---|---|---|---|---|
| 2,361,348 A | * | 10/1944 | Dickson et al. | 264/278 |
| 4,240,498 A | * | 12/1980 | Frenette | 164/303 |
| 4,768,943 A | * | 9/1988 | Honsa | 425/236 |

(Continued)

FOREIGN PATENT DOCUMENTS

| DE | 215 974 A1 | 11/1984 |
|---|---|---|
| EP | 1 531 033 | 5/2005 |

(Continued)

OTHER PUBLICATIONS

International Search Report, PCT/EP2010/051402, mailed Apr. 12, 2010.

*Primary Examiner* — Jill Heitbrink
(74) *Attorney, Agent, or Firm* — Winston & Strawn LLP

(57) ABSTRACT

A core assembly for an injection molding-machine. The assembly includes a movable mold half and a stationary mold half clamped onto each their platen of an injection molding-machine. It also includes an actuator for advancing and retracting during operation at least one core into and from a mold cavity in a mold. The actuator is connected to a core-carrier for carrying the at least one core. The core-carrier is slidingly mounted to and partly projecting from a guidance connected to one of the mold halves. A first hole is formed in the closed mold for slidingly receiving the projecting part of the core-carrier. The core assembly allows products to be continuously molded with an extremely high degree of accuracy, and it is simple, inexpensive and easy to mount and maintain while also allowing for positioning of cores at various angles relative to the mold.

14 Claims, 7 Drawing Sheets

(56) References Cited

U.S. PATENT DOCUMENTS

| | | | |
|---|---|---|---|
| 4,958,676 A * | 9/1990 | Kuntz | 164/340 |
| 5,135,700 A * | 8/1992 | Williams et al. | 264/318 |
| 7,381,051 B2 * | 6/2008 | Wang et al. | 425/577 |
| 2005/0106284 A1 | 5/2005 | Yang et al. | 425/576 |
| 2010/0001436 A1 | 1/2010 | Axelsson | 264/328.16 |

FOREIGN PATENT DOCUMENTS

| | | |
|---|---|---|
| EP | 1 884 336 | 2/2008 |
| JP | 57001710 | 1/1982 |
| JP | 2004142246 | 5/2004 |
| WO | WO 2008/015274 | 2/2008 |

* cited by examiner

CORE ASSEMBLY FOR AN INJECTION MOULDING-MACHINE

This application is a 371 filing of International Patent Application PCT/EP2010/051402 filed Feb. 5, 2010.

BACKGROUND

The invention relates to a core assembly comprising an actuator for during operation advancing and retracting at least one core into and from a mould cavity in a mould consisting of two mould halves clamped onto each their platen of an injection moulding-machine, whereby the actuator is connected to a core-carrier for carrying the at least one core.

The invention also relates to an injection moulding-machine comprising said core assembly and a method of manufacturing moulded products by utilizing the moulding-machine.

Injection moulding is a popular and efficient technique to mass-produce plastic products for various applications. There are few limitations as to the shape and complexity of injection moulded products. Accordingly, recent decades have seen an ever-increasing number of custom-shaped moulded products.

Many of those products are formed with openings, undercuts or the like formed in the side of the products. Core assemblies therefore is required for imparting the cores to be moved to and fro into a direction forming an angle with the direction in which plastic is injected into the mould cavity in the mould.

A known core assembly of this kind comprises a cam pin arrangements where an angular pin disposed in the movable mould half is used for moving a cam slide carrying a core. Upon opening and closing of the mould, the angular movement of the cam pin translates into sliding motion of the cam slide and the attached core.

An inherent drawback of this approach is that it depends on an optimal fit of components including the mould halves, which often are subject to some compression and expansion during operation. Also, cam pins may be prone to deflection and displacement owing to the force component acting in the mould clamping direction. This may increase maintenance efforts and costs. Also, the motion of a cam slide sliding in a guideway formed in a mould half cannot be performed with the required accuracy.

Other known core assemblies of this kind are arranged for moving the cam slide independently of the clamping motion of the mould halves. These assemblies include actuators as e.g. hydraulic working cylinders attached to the cam slide and the mould for moving the slide with the core. It is however difficult to connect the actuators to both the cam slide and the mould.

An attempt to solve this problem is known from the PCT application WO 2008/015274 A1. The core assembly comprises also in this case a guideway and a slide, which slidingly is mounted onto the guideway and an actuator in form of a hydraulic working cylinder attached to the slide. The guideway is however attached to a clamping arrangement on the stationary platen of an injection moulding-machine whereby effectively is prevented that the hydraulic working cylinder need to be attached to the respective mold half. The guideway can however in this way not continuously be sufficiently exact orientated in relation to the required motion direction of the core resulting in that the product can be incorrectly moulded.

SUMMARY OF THE INVENTION

The above-mentioned disadvantages of the prior art core assemblies are according to the invention remedied by, in a first aspect of the present invention providing a core assembly which continuously can mould a product with an extremely high degree of accuracy, in a second aspect of the present invention providing a core assembly which continuously can operate with the required security, in a third aspect of the present invention providing a durable core assembly, in a fourth aspect of the present invention providing a simple and inexpensive core assembly, in a fifth aspect of the present invention providing a core assembly which is easy to maintain, in a sixth aspect of the present invention providing a core assembly which is easy to mount, in a seventh aspect of the present invention providing a core assembly that is conveniently adaptable to a given mould, in an eight aspect of the present invention providing a core assembly that allows for positioning of cores at various angles relative to the mould.

The novel and unique features of the invention consists in the fact that the core-carrier slidingly is mounted to and partly is projecting from a guidance, which preferable releasable is connected to one of the mould halves, and that a first hole is formed in the closed mould for slidable receiving the projecting part of the core-carrier.

Thereby is advantageously obtained a core assembly with a simple, inexpensive and durable construction, which is easy to mount and maintain and which during operation functions with the highest degree of accuracy. The core assembly can moreover conveniently be adapted to be mounted onto a given mould at various angles relative to the mould.

The guidance for the core-carrier can in a preferred embodiment of the guide assembly according to the invention be a guide bush with an end part received in a second hole formed in the mould being in its closed position whereby the first hole for receiving a part of the core-carrier is debouching into the second hole for receiving the end part of the guide bush while the second hole is debouching into an edge of the closed mould.

The end part of the guide bush can in an advantageous embodiment of the core assembly moreover be formed with a collar to be received in a complementary formed part of the second hole.

According to the invention can the guide bush in its mounted position in the second hole furthermore be connected to the stationary mould half by means of screws or the like through the collar.

The collar then secures the correct position in both the axial and transverse direction of the guide bush in relation to the mould cavity whereby advantageously is obtained that products with correct shapes continuously can be moulded during operation.

The actuator can in a preferred embodiment of the core assembly according to the invention be a pneumatic or hydraulic working cylinder with a piston and a piston rod. The actuator then can be connected to the guide bush by means of e.g. a flanged joint or a screw joint while the core-carrier is connected to the piston rod of the cylinder.

BRIEF DESCRIPTION OF THE DRAWINGS

The invention will be explained in greater details below, giving further advantageous features and technical effects and describing exemplary embodiments with reference to the drawing, in which.

DETAILED DESCRIPTION OF THE INVENTION

The core assembly according to the invention is used in an injection moulding-machine (not shown) for repeatingly moulding products formed with e.g. holes or undercuts in the side of the products. For the sake of simplicity is the invention here described by means of a simple product in form of a square cup. The core assembly can of course be utilized also for moulding more complicated products.

The core assembly consists in the main of one or more core-carrying units and holes formed in the mould, seen in closed position, for at least partly receiving the core-carrying units.

The mould consists of two mould halves clamped onto a movable and a stationary platen (not shown) of the injection moulding-machine. In one or both mould halves is formed a mould cavity.

Figure 1:
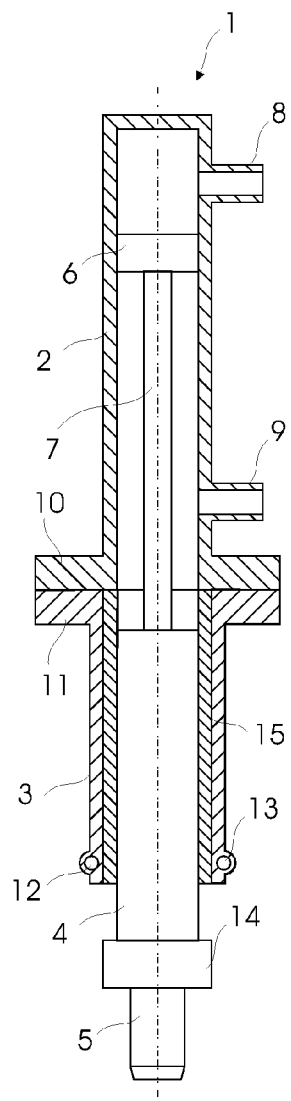
FIG. 1 is a side elevation, seen in axially cross section, of a first embodiment of a core-carrier unit of the core assembly according to the invention in retracted position.
Figure 2:
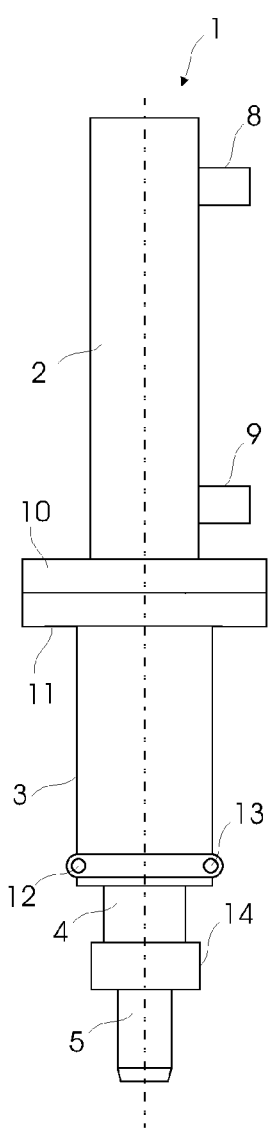
FIG. 2 shows the same seen from without.
Figure 3:
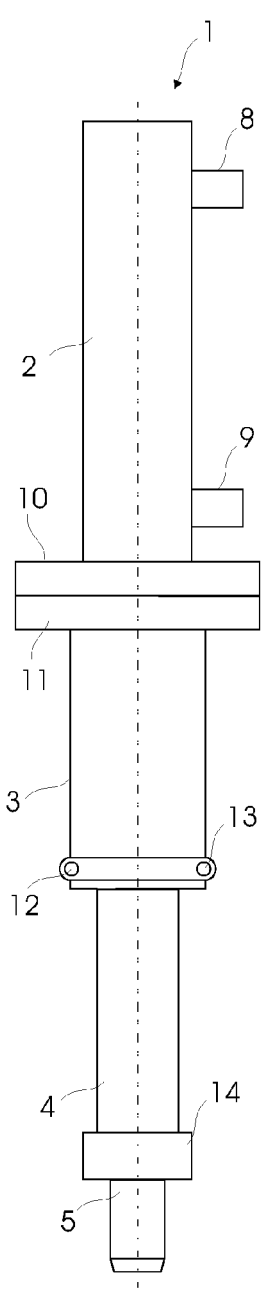
FIG. 3 shows the same, but in advanced position.

FIG. 1 shows a first embodiment 1 of a core-carrying unit according to the invention. In FIG. 1 is the core-carrying unit shown in axial section and in a retracted position and in FIG. 2 as well in retracted position but seen from without. In FIG. 3 is the unit shown also from without but in an advanced position.

The core-carrying unit comprises a working cylinder 2, a guide bush 3 and a core-carrier 4 carrying a first embodiment of a core 5. The core of this first embodiment of the core-carrying unit has a square cross section.

The working cylinder 2 has a piston 6 attached to a piston rod 7 and connecting branches 8 and 9 for connecting the cylinder to a supply (not shown) of pressured air or oil.

The cylinder 2 and the bush 3 are connected to each other by means of a flange 10 on the cylinder and a flange 11 on the bush. E.g. a screw joint can be utilized instead.

The core-carrier 4 is connected to the piston rod 7 of the cylinder 2 by means of a screw joint (not seen). Other connections means can be utilized instead.

The bush 3 is formed with a circumferential collar 12 with two bores 13. The collar can have any suitable shape, but is in this case a bead. The core-carrier is moreover formed with a square block 14.

The purpose of the bead 12, the bores 13 and the block 14 will be described later in more details.

A slide lining 15 is furthermore mounted in the guide bush 3. The lining is made of an abrasion-resistant materiel with a low coefficient of friction whereby the core-carrying unit continuously can function effectively and at the same time can achieve a long lifetime. The materiel can be bronze.

Figure 4:
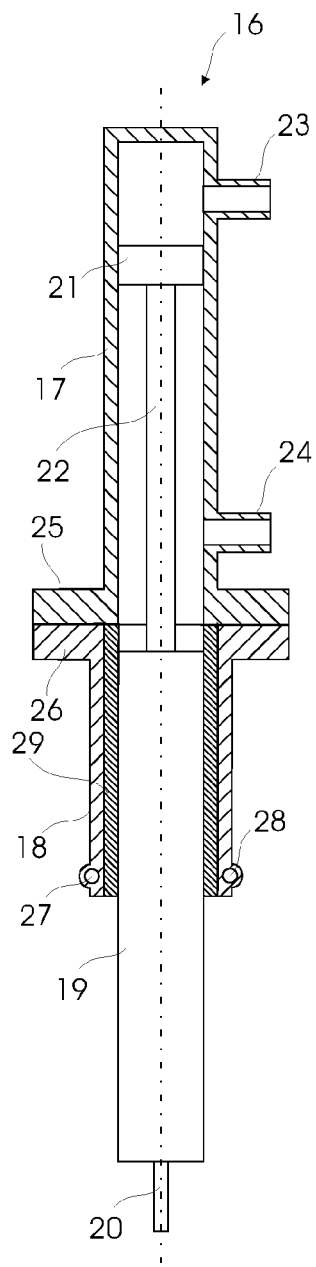
FIG. 4 is a side elevation, seen in axially cross section, of a second embodiment of a core-carrier unit of the core assembly according to the invention in retracted position.
Figure 5:
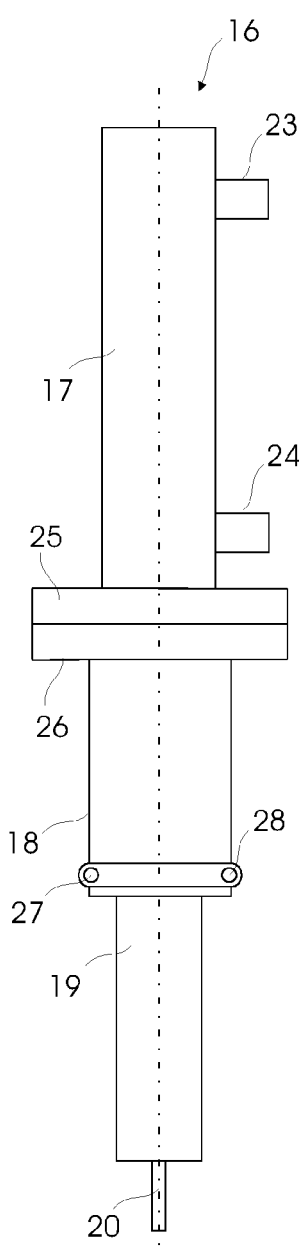
FIG. 5 shows the same seen from without.
Figure 6:
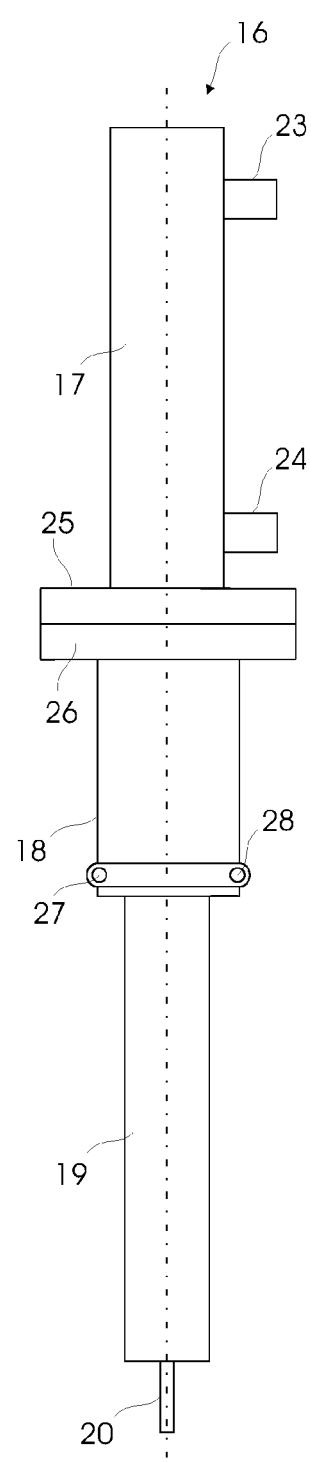
FIG. 6 shows the same, but in advanced position.

FIG. 4 shows a second embodiment of a core-carrying unit 16 according to the invention. In FIG. 4 is the core-carrying unit shown in axial section and in a retracted position and in FIG. 5 as well in retracted position but seen from without. In FIG. 6 is the unit shown also from without but in an advanced position.

The core-carrying unit comprises a working cylinder 17, a guide bush 18 and a core-carrier 19 carrying a second embodiment of a core 20. The core of this second embodiment of the core-carrying unit has a circular cross section.

The working cylinder 17 has a piston 21 attached to a piston rod 22 and connecting branches 23 and 24 for connecting the cylinder to a supply (not shown) of pressured air or oil.

The cylinder 17 and the bush 18 are connected to each other by means of a flange 25 on the cylinder and a flange 26 on the bush. E.g. a screw joint can be utilized instead.

The core-carrier 19 is connected to the piston rod 22 of the cylinder 17 by means of a screw joint (not seen). Other connections means can be utilized instead.

The bush 18 is formed with a circumferential collar 27 with two bores 28. The collar can have any suitable shape, but is in this case a bead.

The purpose of the bead 27 and the bores 28 will later be closer explained.

A slide lining 29 is furthermore mounted in the guide bush 18. The lining is made of an abrasion-resistant materiel with a low coefficient of friction whereby the core-carrying unit continuously functions effectively and at the same time achieves a long lifetime. The materiel can be bronze.

The core assembly consists, as mention above, of core-carrying units and holes formed in the mould, seen in closed position, for receiving the core-carrying units. The core assembly comprises in this case the core-carrying units 1 and 16.

Figure 7:
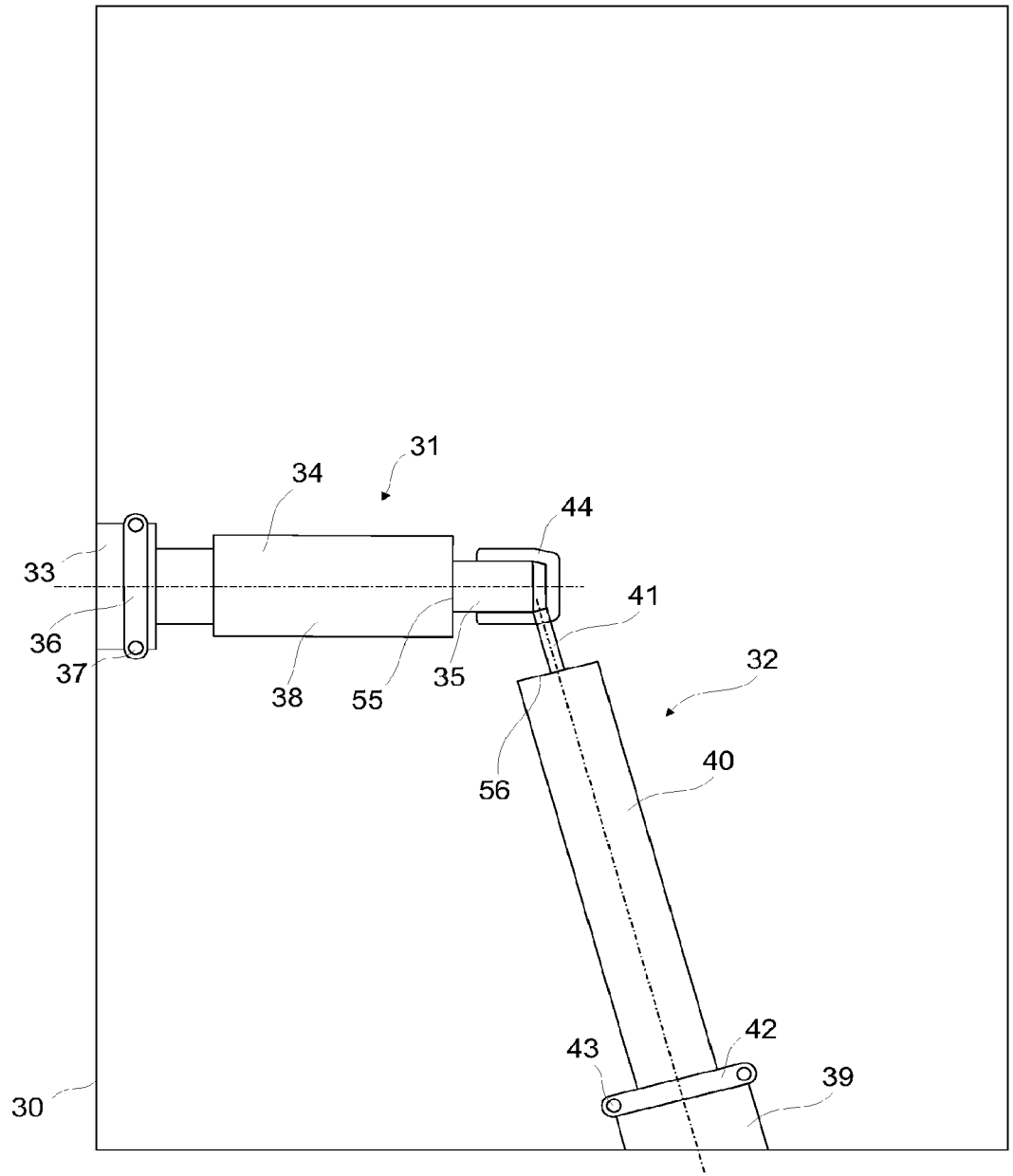
FIG. 7 shows, seen from in front, a mould half, which is clamped onto the stationary platen of an injection moulding-machine formed with a mould cavity and a first and second hole segment adapted for receiving a first and second core-carrier and parts of guide bushes for slidingly receiving the core-carriers.

FIG. 7 shows, seen from in front, the stationary mould part 30 formed with a first hole segment 31 for receiving the first the core-carrying unit 1 and a second hole segment 32 for receiving the second core-carrying unit 16. The term "segment" is here referring to that part of a receiving hole, which is formed in a mould half.

The first hole segment 31 has a first section 33 for wholly or partly receiving the guide bush 3 of the first core-carrying unit 1, a second section 34 for slidingly receiving the core-carrier 4 and a third section 35 for slidingly receiving the core 5.

The first hole segment section 33 is formed with a circumferential groove 36 for receiving the bead 12 and with two threaded holes 37.

The first hole segment 31 moreover is formed with a square recess 38 for slidingly receiving the block 14 of the core-carrier 4.

The second hole segment 32 has a first section 39 for wholly or partly receiving the guide bush 18 of the second core-carrying unit 16, a second section 40 for slidingly receiving the core-carrier 19 and a third section 41 for slidingly receiving the core 20.

The second hole segment section 39 is formed with a circumferential groove 42 for receiving the bead 27 and with two threaded holes 43.

In the stationary mould half 30 is moreover formed a part of a mould cavity 44.

Figure 8:
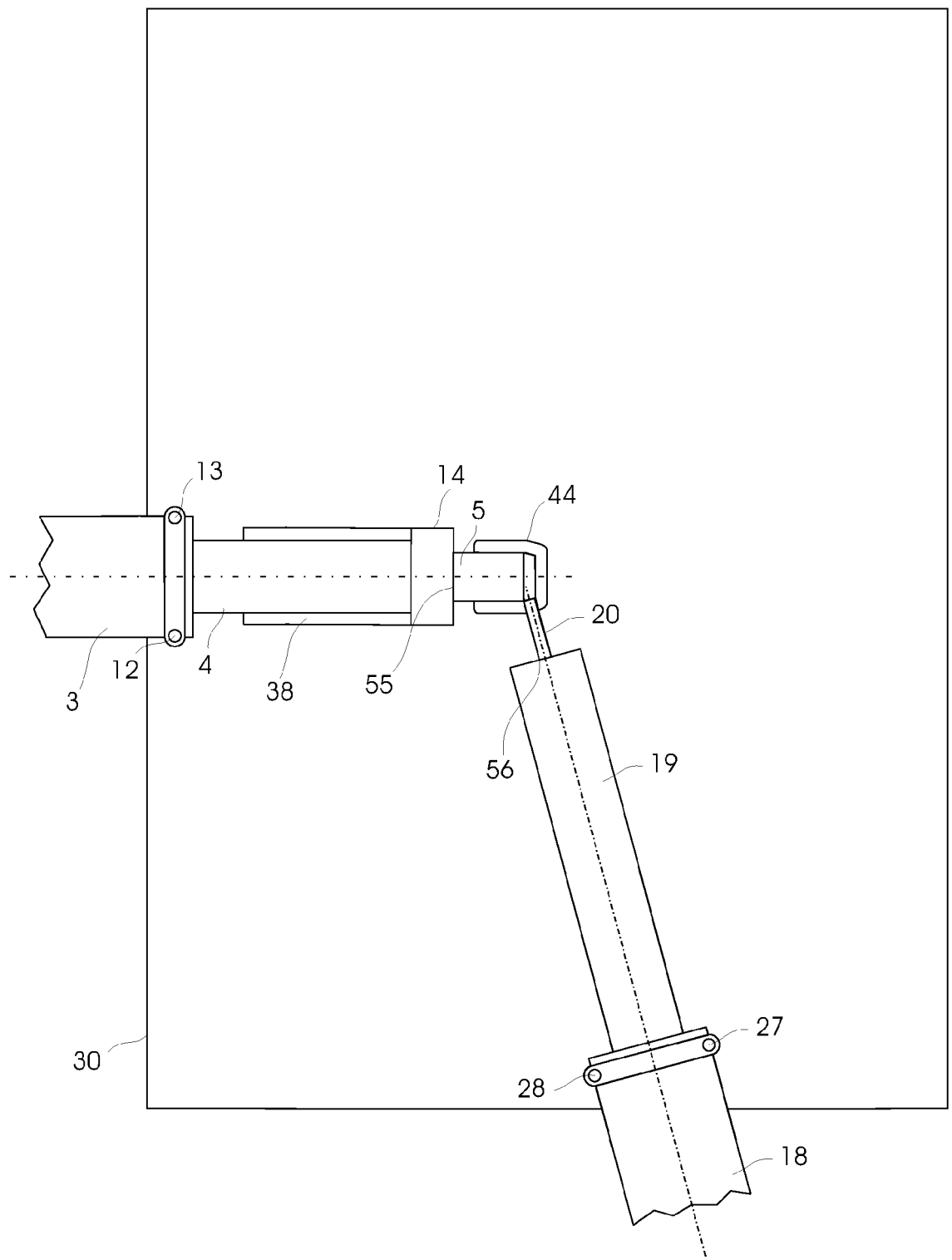
FIG. 8 shows, seen from in front, the mould half, which is clamped onto the stationary platen of an injection moulding-machine mounted with fragments of a first and second embodiment of a core-carrier unit, both being in their advanced position.

The first core-carrying unit 1 has in FIG. 8 been placed in the first hole segment 31 formed in the stationary mould half 30 while the second core-carrying unit 16 has been placed in the second hole segment 32.

Both core-carriers have releasable been connected to the stationary mould half 30 by means of screws (not seen) which has been led through bores (not seen) formed in the beads and screwed into the threaded holes 37 and 43 in the stationary mould half.

The first, second and third sections of each hole segments are flush with each other whereby that advantage is achieved that the core-carriers automatically will be correctly orientated in relating to the mould cavity in the mould by simply attaching the core-carrying units to the stationary mould half.

The direction of the first hole segment 31 for the first core-carrying unit 1 is perpendicular to an edge of the stationary mould half while the direction of the second hole segment 32 for the second core-carrying unit 16 forms an angle with an edge of the stationary mould half.

The core carriers 1 and 16 have in FIG. 8 by means of the working cylinders 2 and 17 been pushed forwards to their advanced positions where the cores 5 and 20 are engaging the mould cavity 44. The core carriers now is in their moulding positions.

Figure 9:
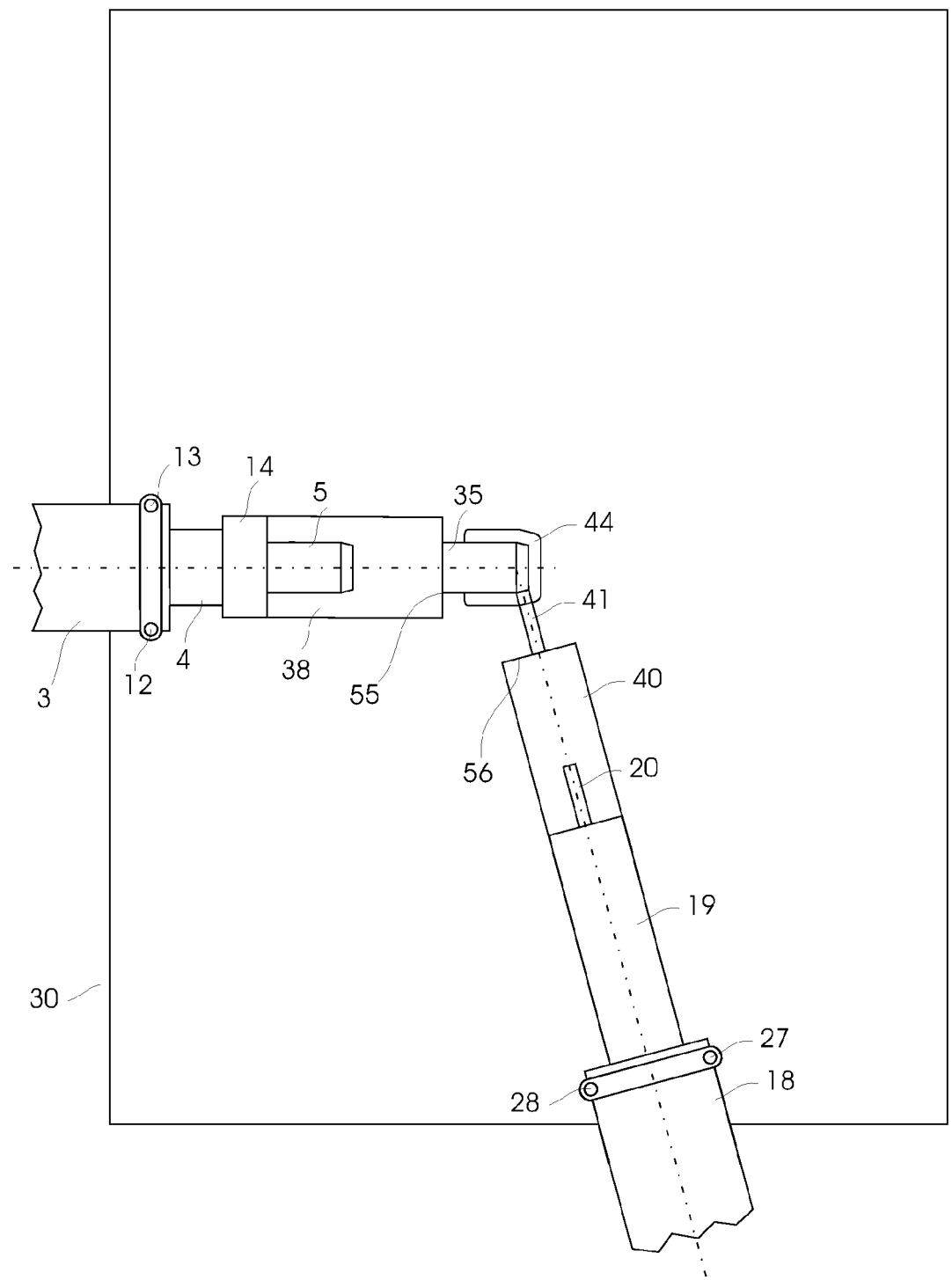
FIG. 9 shows the same, but with the core-carrier units in retracted positions.

FIG. 9 shows the same as in FIG. 8 but with the core-carriers pulled to their retracted position by means of the working cylinders 2 and 17. The block 14 of the core-carrier 31 slides during the retracting operation along the square recess 38.

The square block 14 and the square recess 38 constitute together a key and slot assembling which effectively prevents the first core carrier in turning so that the core always is placed exactly at the same place for each moulding operation and identical products therefore repeatingly can be produced.

Other key and slot assemblings can be used instead. For example a key and slot assembling (not shown), which has a key attached to the core-carrier and a slot formed in the guide bush.

Figure 10:
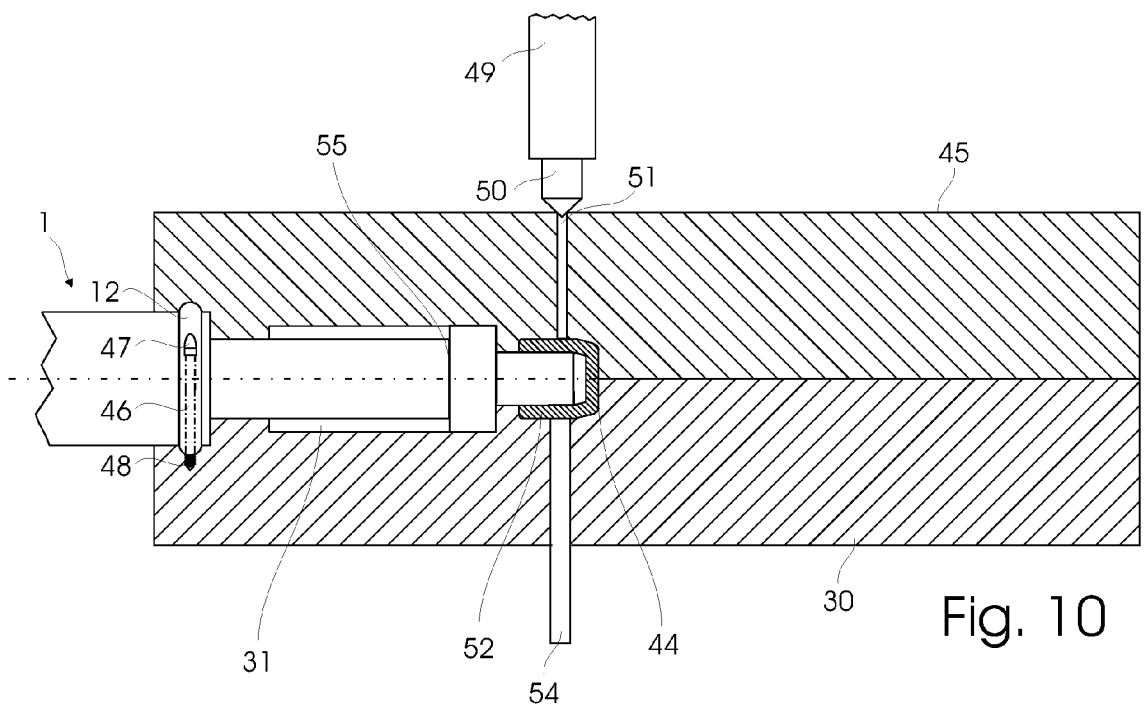
FIG. 10 is a cross section taken along the first embodiment of the core-carrier unit of the mould in closed position and with the core-carrier unit in advanced position being in process of moulding a product in the cavity in the mould.

The closed mould consisting of the stationary mould half 30 and the moving mould half 45 is in FIG. 10 seen in a cross section taken along the axis of the first core-carrying unit 1 which in the figure is only fragmentarily shown.

The first core-carrying unit 1 is placed in the first hole segment 31 and is by means of screws 46, which are led through bores 47 in the bead 12, screwed into threaded holes 48 formed in the stationary mould half 30 for attaching the core-carrying unit to said mould half.

Thereby is in an easy and quick way achieved a firm and durable connection between the core-carrying unit and the mould half. The connection can easily be disconnected for maintenance of the core assembling.

The core-carrying unit is in FIG. 10 in its advanced position where the core is protruding into the cavity 44. During a moulding operation is hot plasticized plastic by means of an injector 49 injected into the cavity 44 through a nozzle 50 and an inlet channel 51 whereby the cavity is filled with the hot plasticized plastic 52 except in those areas of the cavity where the cores are.

The mould thereafter is cooled down to a temperature in which the plastic is sufficiently solid to be ejected.

Figure 11:
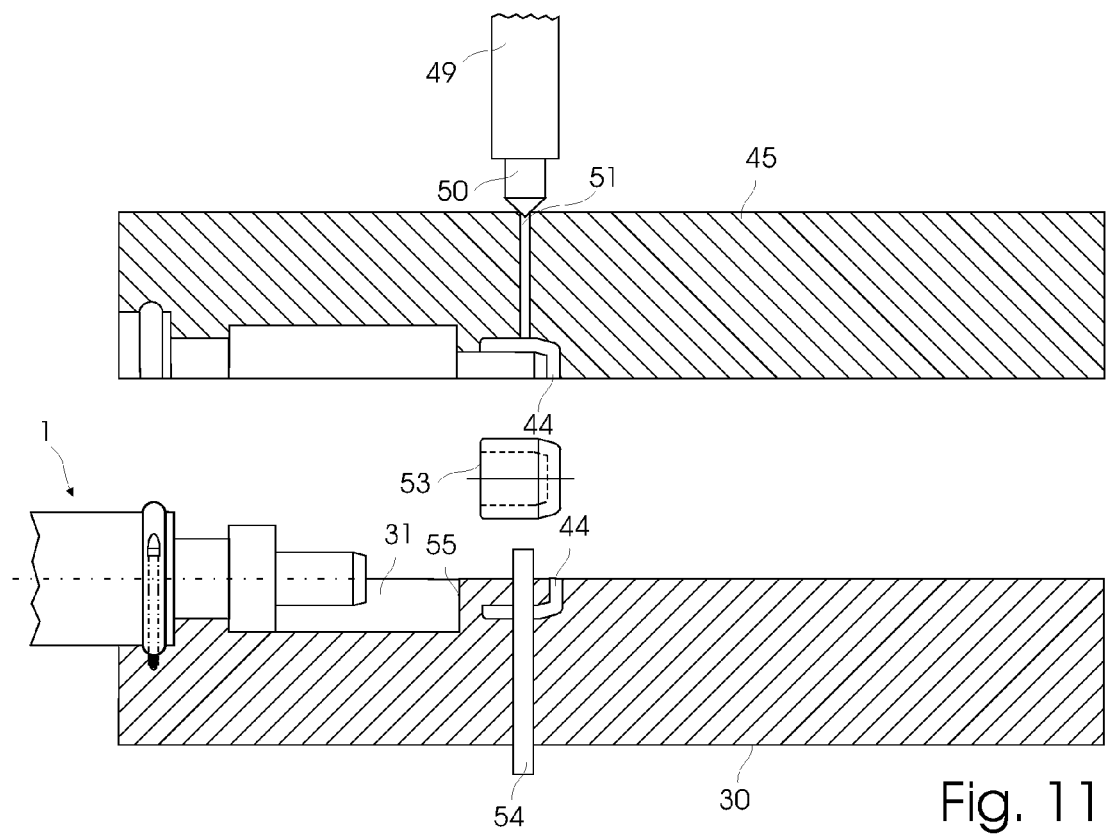
FIG. 11 shows the same, but in open position of the mould and with the moulded product ejected from the cavity of the mould.

This situation is seen in FIG. 11 where the mould has been opened by retracting the movable mould half 45 away from the stationary mould half 30. The product 53 has been ejected by means of an ejector pin 54.

The product is in this case a simple cup, which has square cross section and a square hole complementary to the shape of the first core 5 of the first core-carrier 4.

A round hole has likewise been formed in the wall of the product by means of the second core 20 of the second core-carrier 14. This hole cannot be seen in FIG. 11.

The two halves of the cavity are in this case symmetrical, but can as well be asymmetrical and have different shapes.

Figure 12:
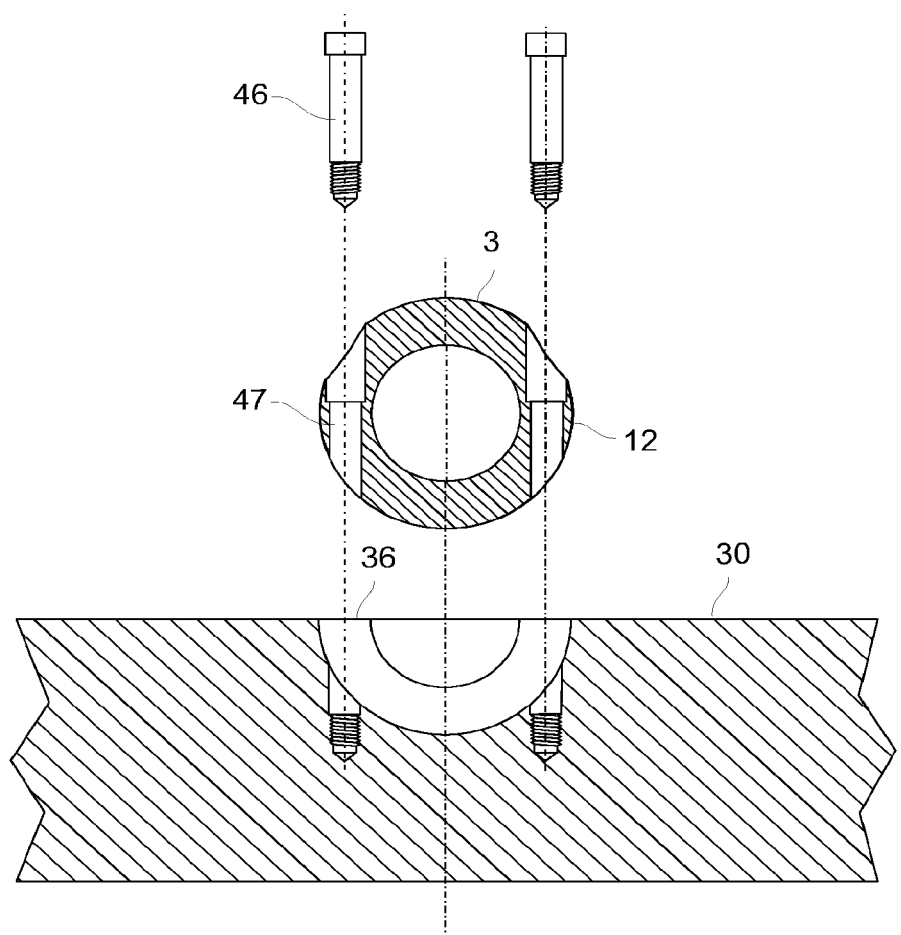
FIG. 12 is, shown in a larger scale, an exploded view of a cross section of a core-carrier unit and a fragment of the stationary mould half.

FIG. 12 is an exploded view of a cross section of the bead 12 on the guide bush 3 and a fragment of the stationary mould half 30. For the sake of simplicity is the guide bush in this case shown without slide lining.

The bead 12 is, as mentioned above, formed with bores 47 for screws 46 while the stationary mould half 30 is formed with threaded holes 48, which fits to the outer thread of the screws 46. Also seen is the groove 36 for receiving the bead 12.

By mounting is the bead 3 placed in the groove 36 after which the screws 46 via the bores 47 in the bead 12 are screwed into the threaded holes 37 in the stationary mould half 30.

Figure 13:
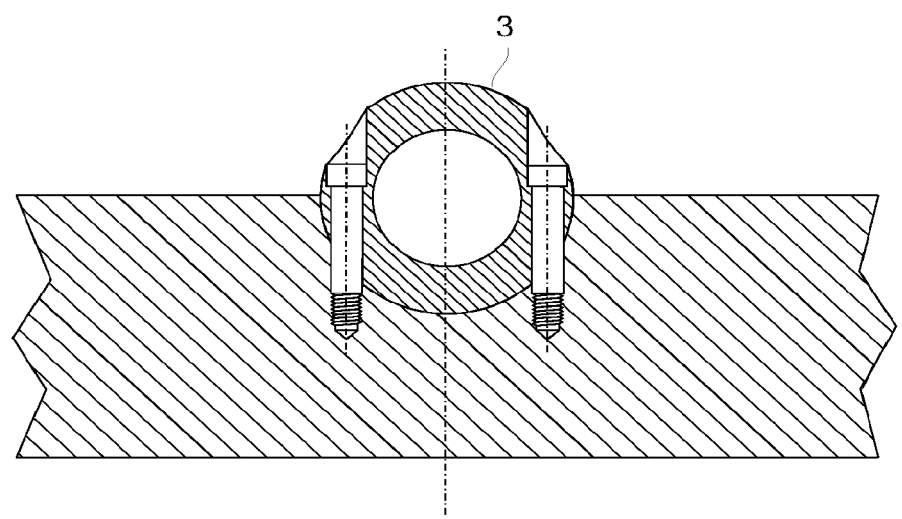
FIG. 13 shows the same but in mounted position of the core-carrier unit.

The guide bush is, as seen in FIG. 13, now solid and securely connected with the stationary mould half.

The shape of the bead 12 is complementary to the shape of the groove 36 for receiving the bead. That implies that the guide bush effectively is secured against being displaced in either the axial or the transverse direction in relation to the cavity in the mould.

The orientation of the core in relation to the mould cavity is therefore precisely defined and securely maintained for each moulding operation.

For being able continuously to produce identical products it is important too that the core always will be advanced to exactly the same predetermined position in the mould half.

This feature is achieved by means of a stop for the carriage of the core. Such stop can e.g. be arranged in the working cylinder, the guide bush or the mould.

In a preferred embodiment according to the invention is the end stop the rearmost end edge in the hole segment, which serves for receiving the core-carrier and is formed in the mould halves.

The core-carrier being advanced will thereby automatically be stopped in exactly the same predetermined position each time a moulding operation is carried out.

In FIGS. 7-11 is the end edge of the first whole segment 31 denoted 55 and in FIGS. 7-9 is the end edge of the second hole segment 32 denoted 56.

The core carrier of the invention is above described on basis of that the collar on the guide bushes is a circumferential bead. The collar can however have any other suitable shape and doesn't either need fully to extend over an angle of 360°.

Also, other means then collars can within the scope of the invention be used for securely attaching the guide bush to the stationary mould half.

Such other means can, by way of example, be a square bar which is protruding from the guide bush and fits into a complementary formed recess in the stationary mould half.

The actuator for moving the core-carrier to and fro between its advanced and retracted position is above described as a working cylinder. Any other suitable kind of actuators can however be used within the scope of the invention, e.g. a step motor, which furthermore advantageously can be adapted electronically to stop the core-carrier and thereby the core precisely in its advanced and retracted position.

The core-carrier described above and shown on the drawing is each mounted with only one core. Each core-carrier can however carry more cores.

The mould described above and shown on the drawing is equipped with two core-carrying units. A mould can however, within the scope of the invention, be equipped with more than two core-carrying units.

What is claimed is:

1. A mould having a movable mould half and a stationary mould half clamped onto a platen of an injection moulding-machine, and a core assembly comprising an actuator for advancing and retracting at least one core into and from a mould cavity in the mould during operation, wherein the actuator is connected to a core-carrier for carrying the at least one core, with the core-carrier slidingly mounted to and partly projecting from a guidance connected to one of the mould halves, wherein a first hole is formed in the closed mould for slidingly receiving part of the core-carrier projecting from the guidance and the guidance is a guide bushing having an end part received in a second hole formed in the closed mould.

2. The mould according to claim 1, wherein the first hole is smaller than the second hole while the second hole terminates at an edge of the closed mould.

3. The mould according to claim 1, wherein the end part of the guide bushing is formed with a collar received in a complementary formed part of the second hole.

4. The mould according to claim 3, wherein the collar is formed as a circumferential bead.

5. The mould according to claim 4, wherein the guide bushing is releasably connected to the mould halves by means of a least one fastener.

6. The mould according to claim 5, wherein the at least one fastener is a screw screwed into a threaded hole formed in that part of the second hole segment, which is formed complementary to the collar formed on the end part of the guide bushing.

7. The mould according to claim 1, wherein the guide bushing is connected to the mould half that is clamped onto the stationary platen of the injection moulding machine.

8. The mould according to claim 1, wherein the first hole extends to or near the mould cavity.

9. The mould according to claim 1, wherein the core assembly comprises means for preventing the core carrier from rotating.

10. The mould according to claim 9, wherein said rotating preventing means is a key formed on the core-carrier and a slot formed in the guide bushing or the second hole.

11. The mould according to claim 1, wherein the guide bushing has a slide lining made of bronze or other material having a low coefficient of friction.

12. The mould according to claim 1, wherein the actuator is a pneumatic or hydraulic piston and cylinder and the core-carrier is connected to the piston.

13. An injection moulding-machine comprising a core assembly comprising an actuator for advancing and retracting at least one core into and from a mould cavity in a mould during operation of the injection-molding machine, wherein the mould has a movable mould half and a stationary mould half clamped onto a platen of the injection moulding-machine, wherein the actuator is connected to a core-carrier for carrying the at least one core, with the core-carrier slidingly mounted to and partly projecting from a guidance connected to one of the mould halves of the mould, wherein a first hole is formed in the closed mould for slidingly receiving part of the core-carrier projecting from the guidance and the guidance is a guide bushing having an end part received in a second hole formed in the closed mould.

14. A method of manufacturing moulded products which comprises molding the products with a moulding-machine comprising a core assembly comprising an actuator for advancing and retracting at least one core into and from a mould cavity in a mould during operation of the injection-molding machine, wherein the mould has a movable mould half and a stationary mould half clamped onto a platen of the injection moulding-machine, wherein the actuator is connected to a core-carrier for carrying the at least one core, with the core-carrier slidingly mounted to and partly projecting from a guidance connected to one of the mould halves of the mould, wherein a first hole is formed in the closed mould for slidingly receiving part of the core-carrier projecting from the guidance and the guidance is a guide bushing having an end part received in a second hole formed in the closed mould.

* * * * *

UNITED STATES PATENT AND TRADEMARK OFFICE
CERTIFICATE OF CORRECTION

| | | |
|---|---|---|
| PATENT NO. | : 8,585,955 B2 | Page 1 of 1 |
| APPLICATION NO. | : 13/147780 | |
| DATED | : November 19, 2013 | |
| INVENTOR(S) | : Axelsson et al. | |

It is certified that error appears in the above-identified patent and that said Letters Patent is hereby corrected as shown below:

Title Page:
Item (56) References Cited, FOREIGN PATENT DOCUMENTS, before "215 974", change "DE" to -- DD --.

Signed and Sealed this
Eighteenth Day of March, 2014

Michelle K. Lee
*Deputy Director of the United States Patent and Trademark Office*